(12) United States Patent
Oliver et al.

(10) Patent No.: US 9,904,797 B2
(45) Date of Patent: Feb. 27, 2018

(54) METHOD AND APPARATUS FOR PROVIDING DATA BASED ON GRANULARITY INFORMATION

(75) Inventors: Ian Justin Oliver, Söderkulla (FI); Tomi Matti Mikael Mikkonen, Espoo (FI); Ora Lassila, Hollis, NH (US)

(73) Assignee: Nokia Technologies Oy, Espoo (FI)

( * ) Notice: Subject to any disclaimer, the term of this patent is extended or adjusted under 35 U.S.C. 154(b) by 219 days.

(21) Appl. No.: 13/332,970

(22) Filed: Dec. 21, 2011

(65) Prior Publication Data

US 2012/0192247 A1 Jul. 26, 2012

Related U.S. Application Data

(60) Provisional application No. 61/427,344, filed on Dec. 27, 2010.

(51) Int. Cl.
*H04L 29/06* (2006.01)
*G06F 21/62* (2013.01)

(52) U.S. Cl.
CPC .. *G06F 21/6245* (2013.01); *G06F 2221/2111* (2013.01)

(58) Field of Classification Search
CPC .................................................. G06F 21/6245
USPC ............................................................. 726/1
See application file for complete search history.

(56) References Cited

U.S. PATENT DOCUMENTS

| 7,716,242 | B2 | 5/2010 | Pae et al. |
| 8,150,967 | B2 * | 4/2012 | King et al. ................... 709/224 |
| 8,154,608 | B2 * | 4/2012 | Ishii ........................... 348/211.1 |
| 2005/0066010 | A1 * | 3/2005 | Treville ........................ 709/207 |
| 2009/0047972 | A1 | 2/2009 | Neeraj |
| 2011/0138480 | A1 | 6/2011 | Janoulis et al. |

FOREIGN PATENT DOCUMENTS

| EP | 0 990 972 A1 | 4/2000 |
| WO | WO 2010/066453 A2 | 6/2010 |
| WO | WO 2010/147828 A1 | 12/2010 |

OTHER PUBLICATIONS

Badger, L. "A Model for Specifying Multi-Granularity Integrity Policies," Unisys Defense Systems, IEEE, 1989, pp. 269-277.

* cited by examiner

*Primary Examiner* — Longbit Chai
(74) *Attorney, Agent, or Firm* — Ditthavong & Steiner, P.C.

(57) ABSTRACT

An approach is provided for providing data based on granularity information. The policy platform determines to act on a request, from an application or a service, for data associated with a device, a user of the device or a combination thereof. Next, the policy platform determines a granularity level for the data based, at least in part, on at least one privacy policy associated with the data, the application, the service, the device, the user of the device or a combination thereof. Then, the policy platform processes and/or facilitates a processing of the data to generate transformed data based, at least in part, on the granularity level.

20 Claims, 14 Drawing Sheets

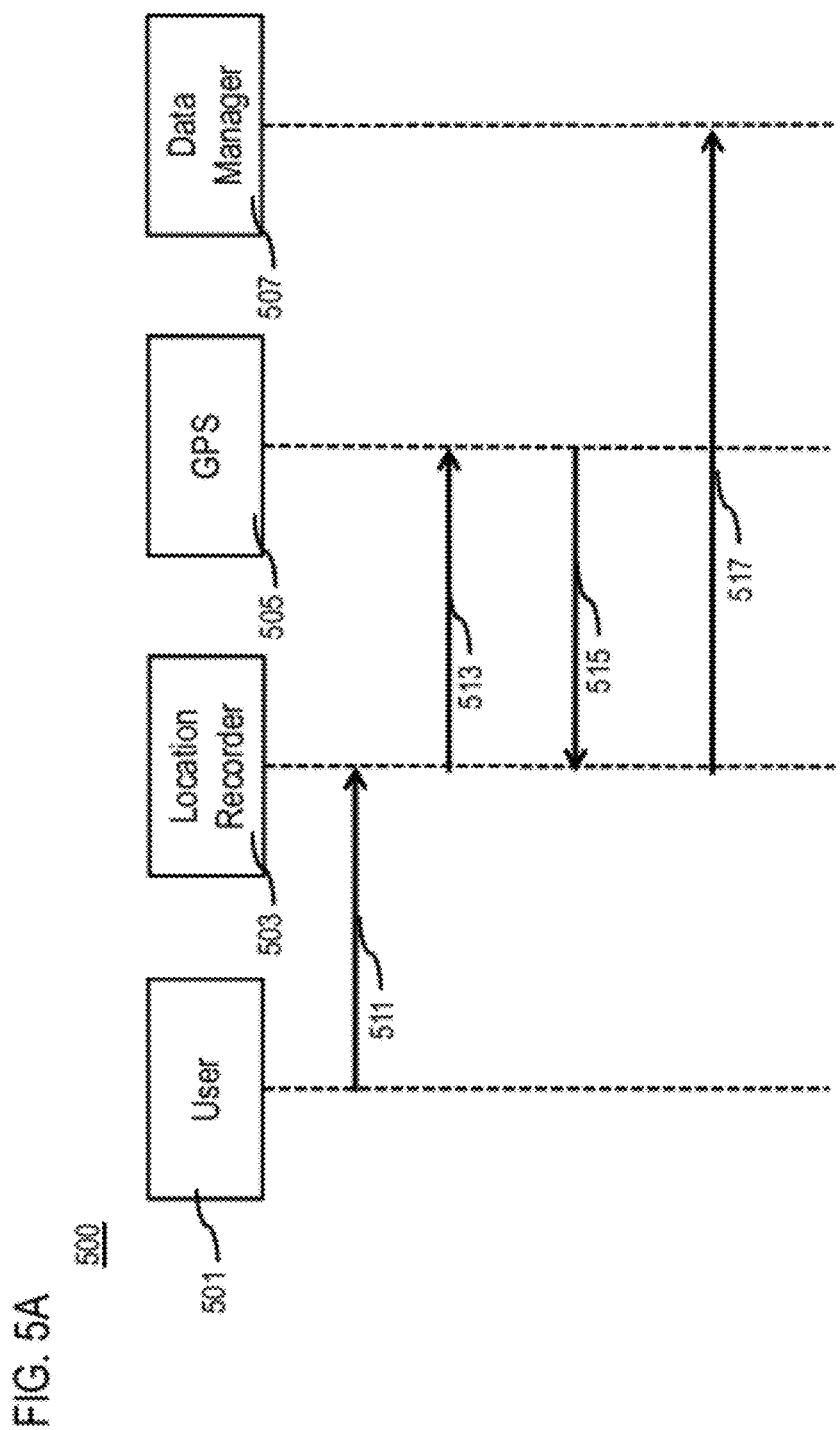

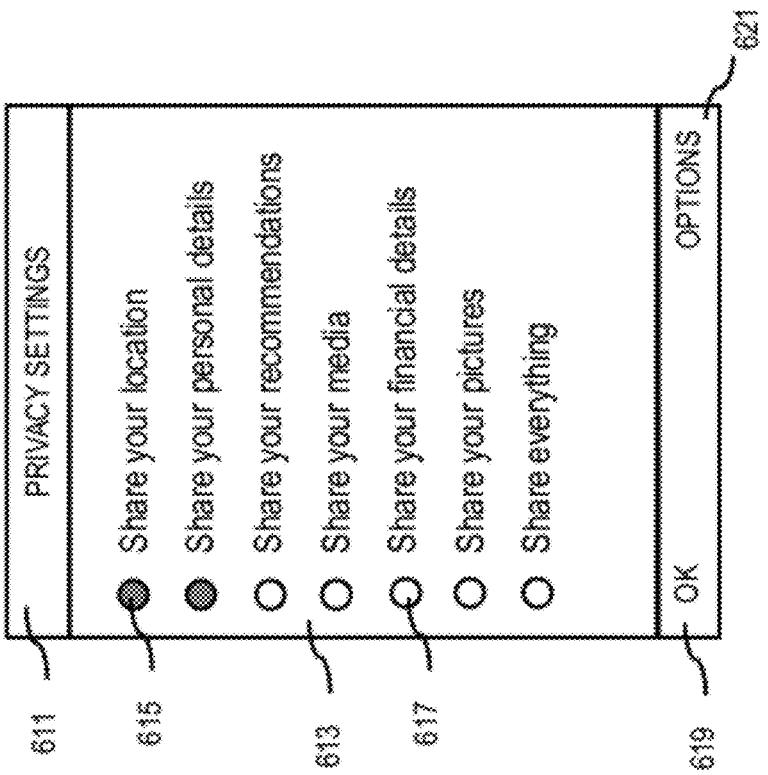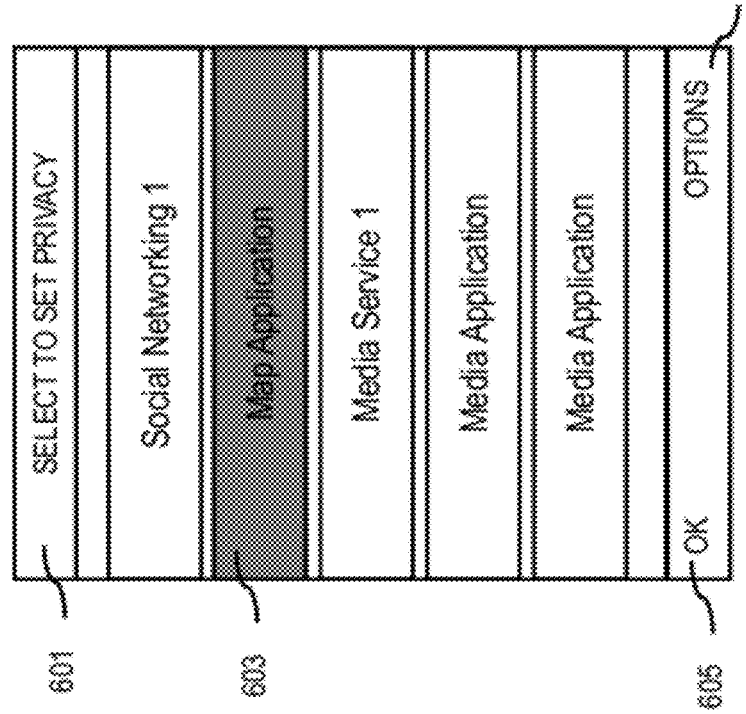

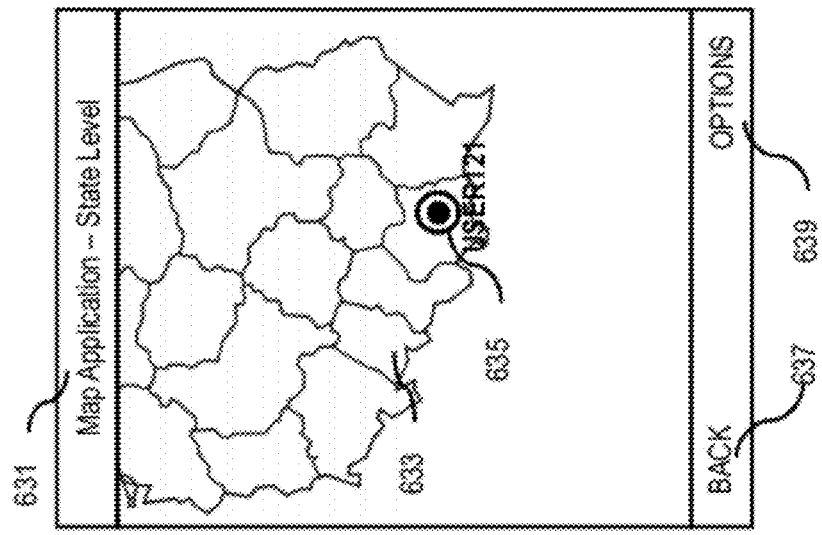

METHOD AND APPARATUS FOR PROVIDING DATA BASED ON GRANULARITY INFORMATION

RELATED APPLICATIONS

This application claims the benefit of the earlier filing date under 35 U.S.C. § 119(e) of U.S. Provisional Application Ser. No. 61/427,344 filed Dec. 27, 2010, entitled "Method and Apparatus for Providing Data Based on Granularity Information," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been sharing information with other users via a communication network. For example, a user can share location information of the user device with other users such that the other users use their respective devices to see the user's location on a map. However, the user may not want to share some information about the user device or the user of the device, especially if the user considers such information private. Some devices or services have features that enable the user to control which information can be shared. For example, social networking services often offer privacy settings to determine which information can be shared with which users. The settings to allow the users to control shared information have been constantly developed and updated. However, because various factors may be considered in determining which information to share, details in allowing sharing the information may be desired.

SOME EXAMPLE EMBODIMENTS

Therefore, there is a need for an approach for providing data based on granularity information.

According to one embodiment, a method comprises determining to act on a request, from an application or a service, for data associated with a device, a user of the device or a combination thereof. The method also comprises determining a granularity level for the data based, at least in part, on at least one privacy policy associated with the data, the application, the service, the device, the user of the device or a combination thereof. The method further comprises processing the data to generate transformed data based, at least in part, on the granularity level.

According to another embodiment, an apparatus comprises at least one processor, and at least one memory including computer program code, the at least one memory and the computer program code configured to, with the at least one processor, cause, at least in part, the apparatus to determine to act on a request, from an application or a service, for data associated with a device, a user of the device or a combination thereof. The apparatus is also caused to determine a granularity level for the data based, at least in part, on at least one privacy policy associated with the data, the application, the service, the device, the user of the device or a combination thereof. The apparatus is further caused to process the data to generate transformed data based, at least in part, on the granularity level.

According to another embodiment, a computer-readable storage medium carries one or more sequences of one or more instructions which, when executed by one or more processors, cause, at least in part, an apparatus to determine to act on a request, from an application or a service, for data associated with a device, a user of the device or a combination thereof. The apparatus is also caused to determine a granularity level for the data based, at least in part, on at least one privacy policy associated with the data, the application, the service, the device, the user of the device or a combination thereof. The apparatus is further caused to process the data to generate transformed data based, at least in part, on the granularity level.

According to another embodiment, an apparatus comprises means for determining to act on a request, from an application or a service, for data associated with a device, a user of the device or a combination thereof. The apparatus also comprises means for determining a granularity level for the data based, at least in part, on at least one privacy policy associated with the data, the application, the service, the device, the user of the device or a combination thereof. The apparatus further comprises means for processing the data to generate transformed data based, at least in part, on the granularity level.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5B are diagrams of processes for sharing a location information of the user with a requester of the location information, according to one embodiment;

FIGS. 6A-6E are diagrams of user interfaces utilized in the processes of FIG. 3, according to one embodiment;

DESCRIPTION OF SOME EMBODIMENTS

Examples of a method, apparatus, and computer program for providing data based on granularity information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
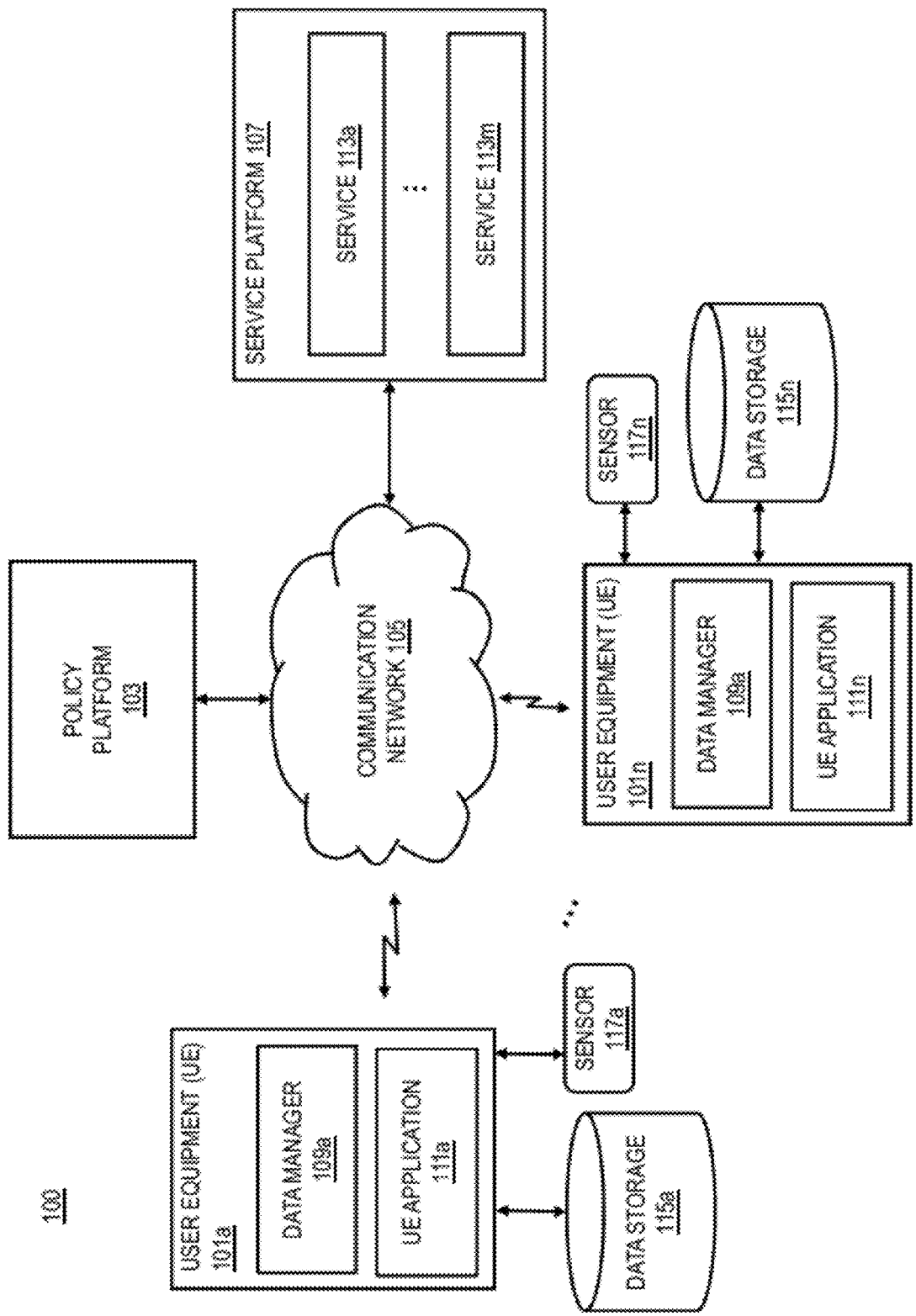
FIG. 1 is a diagram of a system capable of providing data based on granularity information, according to one embodiment.

FIG. 1 is a diagram of a system capable of providing data based on granularity information, according to one embodiment. As discussed previously, users may desire to control the shared information about a user device or the user of the user device. Sharing of information may provide advantages. For example, shared data allows other users to connect with the user sharing the data. As another example, shared data with an advertising service may provide a targeted advertisement for the user's convenience. However, the user may also be harmed by revealing sensitive information, such as personal information, social security number, personal pictures, credit card information etc. Especially when the shared information is sensitive information (e.g., private information), then the user may not reveal such information. Further, within the same type of information, there may be different details of information, and depending on the details of the information, the information may be considered private. The settings and options in current software applications and/or services may provide some protection against revealing such private information. For example, the user may determine which information may be shared with other users, and may also determine which users may access the information about the user device and/or the user of the user device. However, the conventional settings or options may not provide sufficient features in configuring the privacy setting. Thus, users may experience that a desired amount of sensitive information is not shared. Therefore, an approach to enable a user to determine the amount of information to be shared is desired.

To address this problem, a system 100 of FIG. 1 introduces the capability to provide data based on granularity information. According to one embodiment, the system 100 determines to act on a request, from an application or a service, for data associated with a device and/or a user of the device. For example, an application or a service may request to retrieve the data associated with a device and/or a user of the device, such that this data may be shared with the application or the device. The data may include various types of data including a user profile information, digital media in a user device, user calendar information, context information of the user, etc. Then, the system 100 determine a granularity level for the data based, at least in part, on at least one privacy policy associated with the data, the application, the service, the device, the user of the device or a combination thereof. The granularity level may represent a level of details, in one example. In another example, the granularity level may also represent a hierarchy of information. Further, in another example, the granularity level may be related to types of information. Therefore, determining the granularity level may determine what kind of data will be processed. The privacy policy may provide a mechanism as to how the granularity level may determine which data to process. The policy may be made up of rules and/or equations to consider various factors. Then, the system 100 process the data to generate transformed data based, at least in part, on the granularity level. In one example, the transformed data may be the data to be shared or to be accessed by another device, application, services, etc.

In a sample use case, if the information to be revealed is location information of the user device, the granularity level may determine how the location information is to be revealed. Accessing of the user device's location information may depend on applications and granularity level settings for the respective applications. For example, granularity levels for a navigation application, a geotagging application and a location-based advertisement application may be high, medium and low, respectively. In this example, a privacy policy model may determine that for a high granularity level, an exact location of the user device may be accessed by the navigation application, which may be at a level of detail that shows an estimated coordinate of the user device or street names of the location. For a medium granularity level, in case of the geotagging application, less detailed information may be accessed. For example, a name of a city's region where the user device is located may be accessed as location information. For a low granularity level, the location-based advertisement application may access only a name of the city as location information. The location information may be presented on a map based on the granularity level. For example, for a low granularity level, a map may display the details for a city-level and the location of the user device at this detail level, whereas a map for a high granularity level may show details of the streets and/or landmarks surrounding the location of the user device.

As shown in FIG. 1, the system 100 comprises user equipment (UEs) 101a-101n (also collectively referred to as UEs or UE 101) having connectivity to a policy platform 103 via a communication network 105. The UE 101 and the policy platform 103 may also have connectivity to the service platform 107. The UE 101 may include a data manager 109 (e.g., respective data managers 109a-101n of the UEs 101a-101n) that communicates with the policy platform 103 to determine accessibility of the data related to the UE 101 and/or the user of the UE 101. The policy platform 103 may exist independently, or within the UE 101, or within the service platform 107. The policy platform 103 may be used to manage data upon a request for the data from an application or a service. The application may be a UE application 111 (e.g., UE applications 111a-111n), which may include various types of software application in the UE 101. By way of example, if the user device is the UE 101a, the application that requests for the data may be the UE application 111a or an application of another device such as the UE application 111n of the UE 101n. The service that requests for the data may include at least one of the services 113a-113m in the service platform 107, which are accessible via the communication network 105. After this request is made, the policy platform 103 determines the granularity level for the requested data based on the privacy policy associated with the data, the application, the service, the device (e.g., UE 101), the user of the device or a combination there of. Therefore, the privacy policy may depend on a plurality of factors. The data that is requested is then processed to generate transformed data based on the granularity level. The granularity level may determine an amount of the data, a type of the data, a detail level of the data, or a combination thereof to include in the transformed data. Thus, for example, the transformed data may be the data to be accessed or to be shared with the requesting application and/or services. The requested data may include context data, user identity data, user profile data, or a combination thereof. The context data may include location information, and the granularity level may determine the detail level, the exactness, or a combination thereof of the location information in the transformed data. Thus, the context data may be acquired via the sensor 117 (e.g., sensors 117a-117n of UEs 101a-101n), which may include a location sensor. Further, the UE 101 may be connected to a sensor 117, which is used to collect various types of sensor data. The sensor may include a location sensor such as a global positioning system (GPS) device, a sound sensor, a speed sensor, a brightness sensor, etc. The UE 101 may also be connected to a data storage medium 115 (e.g., data storage media 115a-115n) to store various types of data. The sensor data may be stored at the data storage medium 115 after being collected by the sensor 117.

Based on the requested data, different transformed data may be generated depending on the granularity level. The data manager 109 may enable access to the transformed data by other devices or services. The transformation of the data may include blocking access to the data as well as modifying extent to which access to the data can be made. In one embodiment, the system 100 may determine a transformation function based on a type of the data, wherein the processing of the data to generate the transformed data is based, at least in part, on the at least one transformation function. Thus, the transformation function may provide guidelines as to how to generate the transformed data. Further, in one example, if there are multiple types of data, the transformation function may be used as a mechanism to consolidate the multiple types such that the transformed data can be generated based on the multiple types of data.

In one embodiment, the system 100 determines an intended use of the data by the application or the service, such that the determination of the granularity level is further based on the intended use. Thus, some intended use may result in a higher granularity level while other intended uses may result in a low granularity level. For example, if the intended use of the data is to provide advertisement, the system 100 may provide a low granularity level, and provide less detail of the data. This may be because the advertising service, unlike a user's friend, may be considered a stranger or an unknown service that the user does not feel comfortable sharing much of the information about the user. On the contrary, if the intended use of the data is to share the data with close family members, then the system 100 may provide a high granularity level, and then provide detailed information from the data. This may be because the close family members may be more trusted than advertisement services, and thus sharing detailed information with the close family members may not be as disadvantageous as sharing with the advertisement services. Further, in one embodiment, the system 100 may associate the transformed data with the content associated with the application and/or the service. For example, the system 100 may associate the transformed data about a user's location with an advertising service such that the advertising service may provide the user with advertisements based on the transformed data on the location. As another example, the system 100 may associate the transformed data about a user's location with a geotagging application, such that the geotagging application may utilize the transformed data to find a tagged location.

In one embodiment, the system 100 determines a source of the data based on the granularity level, and causes acquisition of the data from the source. The source may include sensors (e.g., sensor 117), other applications (e.g., UE application 111), other services (e.g., services 113a-113m), one or more databases (e.g., data bases stored in the data storage 115 and/or the service 113), or a combination thereof. For example, if the granularity level indicates that a high level of details in the location information are to be generated as the transformed data, then a global positioning system (GPS) device may be used as the source to acquire the location data, because the GPS device provides detailed location information. In contrast, if the granularity level indicates that a lower level of details are to be generated as the transformed data, then a mobile location estimation based on the cellular network may be used as the source to acquire the location data. The mobile location estimation can generate location estimation is less detailed than the information provided by the GPs device, and thus for a lower granularity level, the mobile location estimation may be utilized to acquire the data.

Further, in one embodiment, if the request, the application, the service, or a combination thereof is associated with structured content, the system 100 may determine elements of the data (e.g., requested data) in the structured content and then determine to initiate sharing of the elements of the data and/or the structured content based on privacy policy, the granularity level, the transformed data, or a combination thereof. For example, if the requested data is associated with a picture data containing the user's personal profile information and the user's location information, the requested data may determine these elements of the picture data, wherein the elements are the user's personal profile information and the user's location information. These elements may be shared based on the privacy policy, the granularity level, the transformed data, or a combination thereof. For example, there may be different privacy policies for the picture itself, for the personal profile information and for the location information. Thus, in one example, although the requested data may be associated with the same picture data, the privacy policy may allow sharing only the picture itself, and not share the personal profile information and the location information, as the personal profile information and the location information may be considered sensitive information.

Also, in one embodiment, the system 100 may determine a recipient device and/or a recipient user associated with the request, wherein the granularity level is further based on the recipient device and/or the recipient user. For example, a certain users such as friends or family may affect the granularity level to be high because they may be more trusted than strangers. Further, because devices have different capabilities, the granularity level may be affected by the capabilities of the recipient device. For example, if the recipient device is not capable of handling high detail location information, then the granularity level may be set such that location information with low detail may be included in the transformed data.

In one embodiment, the privacy policy may be specific to the application, a group of applications, the service, a group of services, a device, a user, a system, or a combination thereof. As one example, one privacy policy may be specific to one software application, while another privacy policy may be specific to another software application. As another example, a privacy policy may be specific to a group of services that are considered as advertising services. Also, as another example, there may be a privacy policy specific to a device with a GPS device and another privacy policy specific to a device without the GPS device such that the privacy policy may be different depending on the capability of the device.

Therefore, an advantage of this approach is that the data requested to be accessed by another user or another application/service may be transformed based on the granularity level based on the privacy policy such that the transformed data has the type, amount, detail of the data based on the granularity level. Because the user may desire to share different type, amount and detail of the data depending on who is accessing the data, this approach is convenient in that it provides a way to share the data based on the user's privacy policy. Therefore, means for providing data based on granularity information is anticipated.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the policy platform 103 and the service platform 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
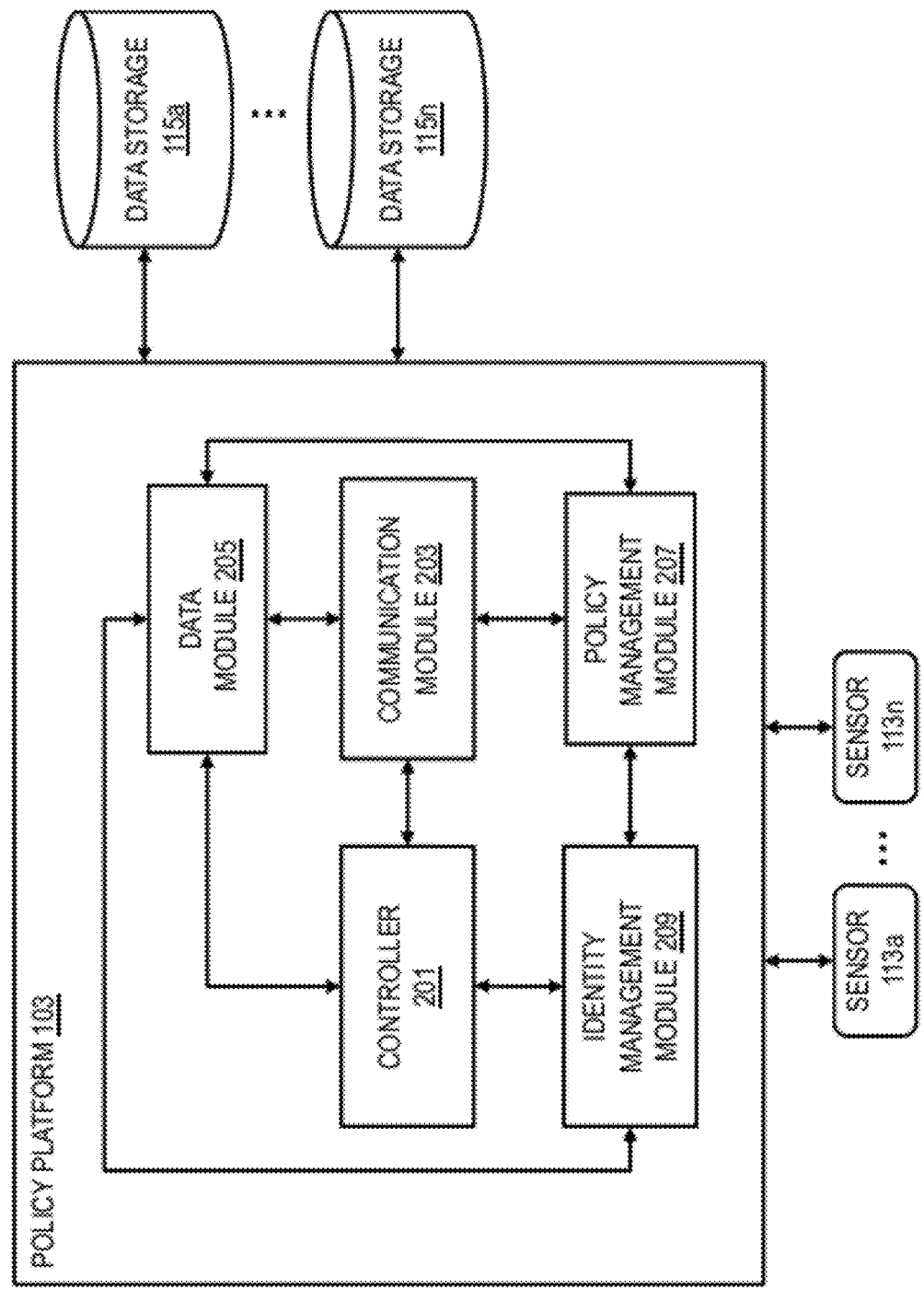
FIG. 2 is a diagram of the components of the policy platform, according to one embodiment.

FIG. 2 is a diagram of the components of the policy platform 103, according to one embodiment. By way of example, the policy platform 103 includes one or more components for providing data based on granularity information. It is contemplated that the functions of these components may be combined in one or more components or performed by other components of equivalent functionality. In this embodiment, the policy platform 103 includes a controller 201, a communication module 203, a data module 205, a policy management module 207 and an identity management module 209. The controller 201 oversees tasks, including tasks performed by the communication module 203, the data module 205, the policy management module 207 and the identity management module 209. The communication module 203 manages communication of data among the UE 101, the policy platform 103, and the service platform 107. The communication module 203 also manages communication of signals (e.g., a request, a command) that are communicated among the UE 101, the policy platform 103, and the service platform 107. The data module 205 manages various types of data, and also is capable of determining elements within a data. The data module 205 may also generate transformed data based on a granularity level. The data module 205 may work together with the communication module 203 to select data to transfer in and out of the policy platform 103. The policy management module 207 manages tasks related to policy (e.g., privacy policy) as well as a granularity level which is based on the policy. The identity management module 209 determines and manages various identities including identities of users, identities of applications and application providers/venders as well as identities of the devices (e.g., UE 101).

In one embodiment, the communication module 203 receives a request, from an application or a service, for data associated with a device (e.g., UE 101) and/or a user of the device. The application may be an application (e.g., UE application 111) in the user device (e.g., UE 101) or another device. The service may be any type of service, including social networking services, digital media services, etc. The requested data may include context data, user identity data, user profile data, etc. The requested data may also include media data in the user device. The context data may include location information, sensor data, user calendar data, time, weather, etc. The location information may also be the sensor data that is obtained via a location sensor such as the GPS device. The policy management module 207 determines to act on this request for the data. Next, the policy management module 207 determines a granularity level for the data based on a privacy policy associated with the data, the application, the service, the device, the user of the device or a combination thereof. The privacy policy may be specific to the application, a group of applications, the service, a group of services, a device, a user, a system, or a combination thereof. Therefore, the identity management module 209 may determine identities of the applications, the services, devices, the users, the system, etc. such that appropriate privacy policy may be used depending on their identities. Then, the policy management module 207 and the data module 205 process the data to generate transformed data based on the granularity level. The granularity level may determine an amount of the data, a type of the data, a detail level of the data, or a combination thereof to include in the transformed data. As one example, if the granularity level is high, more data or higher detail level of the data may be included in the transformed data. For example, for location information of the user device as the requested data, the granularity level may determine the detail level and/or the exactness of the location information in the transformed data. Thus, if the granularity level is high, higher details (e.g., at a street level detail) of the location of the user device may be used in generating the transformed data. On the contrary, if the granularity level is low, low details of the location (e.g., limited to a city level detail) may be used for the transformed data.

In one embodiment, the policy management module 207 may determine a transformation function based on a type of the data. Then, the processing of the data to generate the transformed data may be based on the transformation function. In one example, the privacy policy may be determined based on sensitivity and primary usage. The sensitivity classification for the privacy policy may determine whether the information should be included in the transformed data. In one example, the sensitivity may have three classifications—secret, private and public. The information under the secret classification may never be accessed or shared by other users and/or devices. The information under the private classification may be accessed only in certain conditions. The information under the public classification may always be accessed. Further, the primary usage may have three classifications—share, customer care, and advertising. The information under the share classification may used for sharing with other users, services, devices etc. The information under the customer care classification may be for customer care. The information under the advertising classification may be used for advertising purposes. The sensitivity classification and/or the primary usage classification may be used for different types of data.

As one example, the following tables, table 1 and 2, show four types of the data (media, event, personal, location) for the primary usage classification and the sensitivity classification. As these classifications are a part of the privacy policy, these classifications may be specific to the requesting user or application/service.

TABLE 1

Primary Usage Classification

|  | Share | Care | Advertising |
|---|---|---|---|
| Media | X | X | X |
| Event | X |  |  |
| Personal |  | X | X |
| Location | X | X |  |

TABLE 2

Sensitivity Classification

|  | Secret | Private | Public |
|---|---|---|---|
| Media |  |  | X |
| Event |  | X |  |
| Personal | X |  |  |
| Location |  | X |  |

Table 1 indicates that the media data may be shared, may be used for the customer care, and may be used for advertising. Table 1 also indicates that the event data may be used only for sharing, and the personal data may be used only for the customer care and the advertising. Further, Table 1 shows that the location data may be used for sharing and for customer care. In addition, table 2 indicates that the media data may be available to the public, and the personal data is to be remained secret and not to be accessed by others, while the event data and the location data may be accessed by others under certain conditions. The transformation function may enforce either the sensitivity classification or the primary usage classification, or a combination thereof.

One example of the transformation function enforcing both the primary usage and the sensitivity may be enforcing a combination of table 1 and table 2 (e.g., table 1ⓧ table 2). Then, the media data may be available to the public, and may be used for the sharing, the customer care and advertising. The event data may be used for sharing, and may also be accessed under certain conditions, but not for the customer care or the advertising. The personal data is consider secret, and thus cannot be accessed unless the personal data is used for the customer care or the advertising. The location information may be used for the sharing and the customer care, and may be accessed for certain conditions, but may not be used for the advertising.

As another example, the following table, table 3, shows an example where the primary usage classification has more details than the sensitivity classification of table 1.

TABLE 3

| | Primary Usage Classification | | |
|---|---|---|---|
| | Share | Care | Advertising |
| Media | No Change | No Change | No Change |
| Event | Filter | Block | Block |
| Personal | Block | Filter | Filter |
| Location | No Change | No Change | Block |

In this example, according to table 3, when the media and the location are shared, no change is applied to the media data and the location data, whereas the event data is changed before being shared based on a filter function defined for the user or application/service requesting the data. The personal data in this example is blocked from sharing. For a customer care, the media data and the location data may be accessed without any change, but the event data is blocked and the personal data is filtered. Also, for advertising, the media data may be accessed without any change, but the event data and the location data are blocked from the advertising service, and the personal data is filtered. Further, as discussed above, the transformation function may enforce both the primary usage and the sensitivity by enforcing a combination of table 3 and table 2 (e.g., table 3ⓧ table 2).

Additionally, in an embodiment where the request, the application, the service, or a combination thereof is associated with structured content, the data module 205 may determine elements of the data in the structured content, and then the policy management module 207 may determine to initiate sharing of the elements of the data and/or the structured content based on the granularity level and/or the transformed data. The structured content may be a data file containing one or more elements. For example, an image file may include the actual image data as one element, as well as the location of creation of the image data, user profile information about the creator of the image, as well as the time of creation of the image as elements. Each of these elements may have its own privacy policy, and thus may have its own granularity level. Therefore, when the data module 205 generates the transformed data, the data module 205 considers the granularity levels of the elements. For example, if the granularity levels indicate that the image indicates that the image and the time of creation can be shared, but not the location of creation or the user profile of the creator, then the transformed data may include only the image and the time of creation.

In one embodiment, the policy management module 207 and the data module 205 may determine a source of the data based on the granularity level, and then cause acquisition of the data from the source. The source may include sensors, applications, services, databases, or a combination thereof. For example, if the granularity level is higher, a sensor that is able to acquire more detailed information may be selected, and also the applications and/or services may be configured such that the applications and/or services can acquire more detailed information. In one example, if the granularity level is low for location information, then mobile location estimation may be used as a source for acquiring the location information because the mobile location estimation acquires the location information with less accuracy and less detail. In contrast, if the granularity level is high, then a GPS device may be used as a source to acquire the location information with high accuracy and detail.

In one embodiment, the data module 205 may associate the transformed data with content associated with the application and/or the service. For example, if the transformed data is related to the location information of the user device, then the advertising service may provide advertisement content for the location information, such that the advertisement content can be associated with the transformed data. In another embodiment, the identity management module 209 determines a recipient device and/or a recipient user associated with the request, such that the granularity level may be further based on the recipient device and/or the recipient user. For example, some recipient users and/or recipient devices may contain information that determines the granularity level or the privacy policy.

Figure 3A:
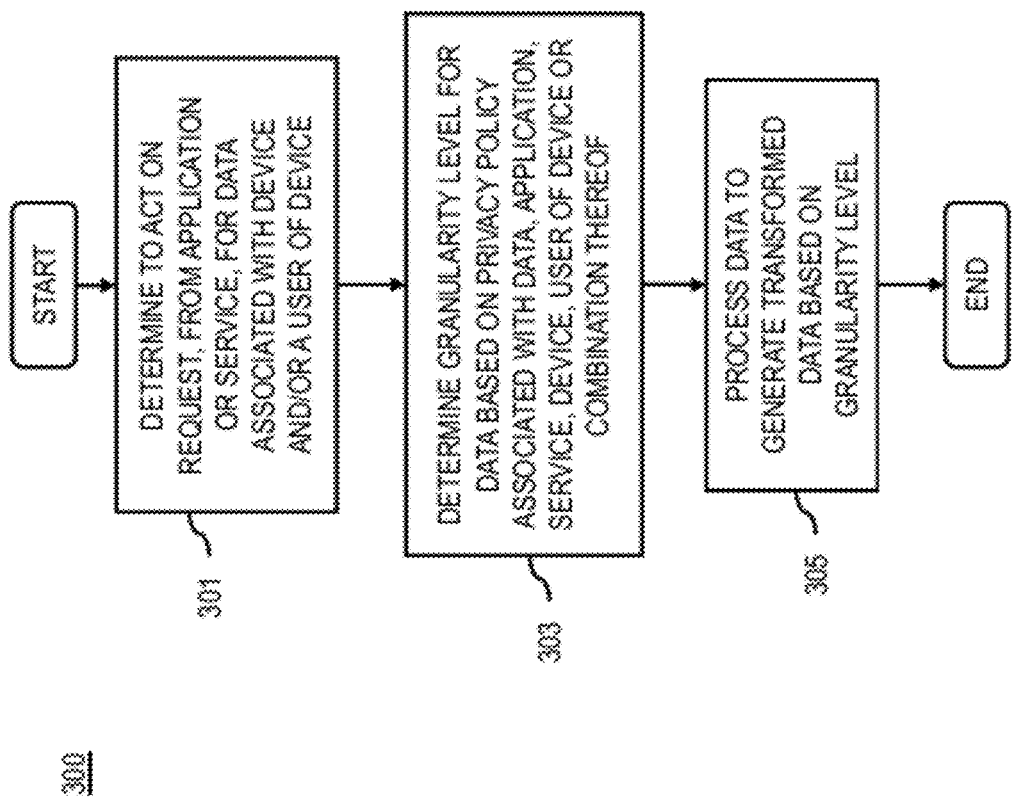
FIG. 3 is a flowchart of a process for providing data based on granularity information, according to one embodiment.
Figure 3B:
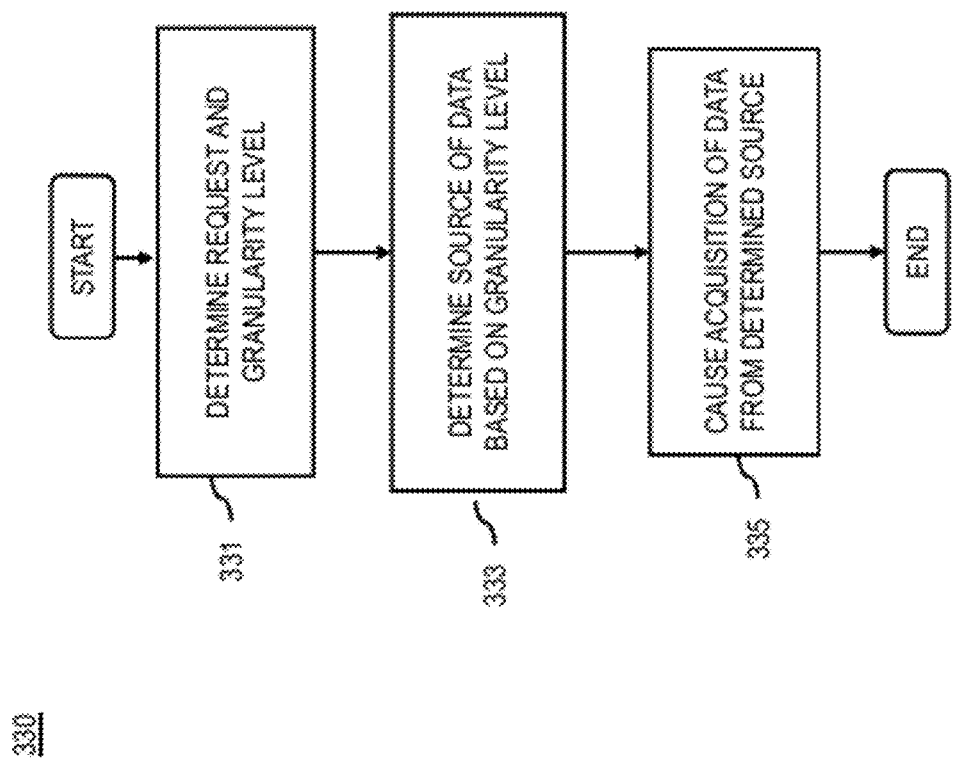
Figure 9:
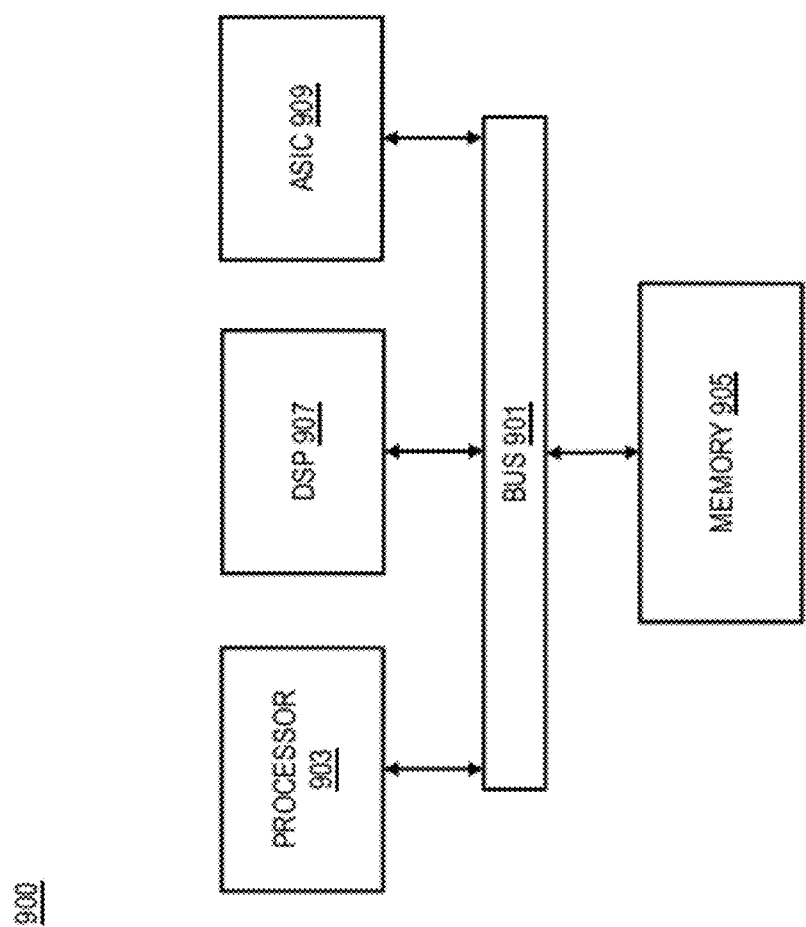
FIG. 9 is a diagram of a chip set that can be used to implement an embodiment of the invention.

FIGS. 3A-3B are flowcharts of processes for providing data based on granularity information, according to one embodiment. FIG. 3A is a flowchart showing a general process for generating transformed data based on granularity level. In one embodiment, the policy platform 103 performs the process 300 and is implemented in, for instance, a chip set including a processor and a memory as shown in FIG. 9. In step 301, the policy platform 103 determines to act on a request, from an application or a service, for data associated with a device, a user of the device or a combination thereof. The policy platform 103 may receive a request from an application, such as the UE application 111, for data associated with a user device (e.g., UE 101). For example, if the UE 101a is the user device, then the policy platform 103 may receive the request from the UE application 111a or the UE application 111n of the UE 101n. The policy platform 103 may also receive the request for data from a service, such as the service 113 in the service platform 107. The requested data may include context data, user identity data, user profile data, or a combination thereof. The context data may include sensor data, date, time, calendar data, etc. The sensor data may be captured by the sensor 117, which may be a location sensor (e.g., GPS device), speed sensor, audio sensor, etc.

In step 303, the policy platform 103 determines a granularity level for the data based, at least in part, on at least one privacy policy associated with the data, the application, the service, the device, the user of the device or a combination thereof. The privacy policy may include information as to what information and/or how much information about the user device or the user of the device can be accessed and who can access such information. Thus, for example, different types of data may have different privacy policies because some data may be considered more private than others. Further, the privacy policy may be different depending on the application and/or the service because the data may be considered private data for some applications and/or services. If the applications and/or the services are considered trustworthy, then such applications and/or services may be subject to different private policy than other applications and/or services. There may be privacy policy specific to each one of the applications (e.g., UE application 111). The applications may be grouped and the privacy policy may be specific to this group such that the same privacy policy applies to the applications in the same group. In a similar way, there may be a privacy policy specific to each of the services, and/or a group of services. The privacy policy may also be specific to a device, and thus may depend on a type of the device. Further, each user and/or system may have privacy policy specific to the user and/or the system.

Once the granularity level is determined, the policy platform 103 processes the data to generate transformed data based, at least in part, on the granularity level, as shown in step 305. Thus, the transformed data may include some or all of the information in the requested data, based on the granularity level. The granularity level determines an amount of the data, a type of the data, a detail level of the data, or a combination thereof to include in the transformed data. For example, if the granularity level is high for location information of the user device, the detail level of the location information in the transformed data may be high, and thus may provide an exact location of the user device. However, if the granularity level is low for the location information of the user device, then the detail level of the location information in the transformed data may be low and only rough information about the location may be included in the transformed data.

In one embodiment, the policy platform 103 determines a transformation function based on a type of the data. Then, the processing of the data to generate the transformed data may be based on this transformation function. The transformation function may provide rules and guidelines on how to generate the transformed data. For example, the transformation function may consider the types of data, sensitivity classification as well as primary usage of the data. The types of the data may include the digital media, user profile information, calendar information, user location information, etc. The sensitivity classification may determine whether the data is considered private or public. The primary usage of the data may indicate how the data is to be used by the user and/or the application/service requesting the data. The primary usage of the data may be to share with the user, to provide access to a customer care service such that the customer care service can provide improved service based on the data, and to provide access to an advertising service such that the advertising service can provide targeted advertisement based on the data. The transformation function may consider all of the three factors, the type of the data, sensitivity information and the primary usage information, and determine to process the data to generate the transformed data based on this transformation function.

Further, in one embodiment, the policy platform 103 determines an intended use of the data by the application or the service, such that the determination of the granularity level is further based on the intended use. For example, if the intended use of the data by the application or the service is for advertising, the user may not want to reveal much information, and thus the granularity level may be determined to be low to provide little details. However, if the intended use is to provide information for customer care, then this is for the user's benefit and thus may result in a medium level or a high level of the granularity level to enable access to sufficient information for the customer care. Further, if the intended use is for sharing the data with close family members, then a high level of the granularity may be used to enable access to detailed information, because the family members may be trusted.

In one embodiment, the policy platform 103 determines a recipient device and/or a recipient user associated with the request, such that the granularity level is further based on the recipient device and/or the recipient user. For example, some recipient devices and/or recipient users may be more trusted than others, and thus higher granularity level may be used for the recipient devices and/or recipient users that are more trustworthy. As another example, some recipient devices and/or recipient users may be able to handle more details or more information than others. In this example, if the recipient device is capable of handling high detail data, then a high granularity level may be used.

FIG. 3B is a flowchart showing data acquisition from a source determined based the granularity level. In one embodiment, the policy platform 103 performs the process 330 and is implemented in, for instance, a chip set including a processor and a memory as shown in FIG. 9. In step 331, the policy platform 103 determines the request for the data associated with a device and/or a user of the device and also determines the granularity level. As discussed previously, the granularity level for the requested data may be based on the privacy policy associated with the requested data, the application, the service, the device, the user of the device, or a combination thereof. In step 333, the policy platform 103 determines the source of the data based on the granularity level, and then in step 335, the policy platform 103 causes acquisition of the requested data from the determined source. The source of the data may include sensors, applications, services, databases, or a combination thereof. For example, if the granularity level is high, a sensor, an application, a service or a database that can provide high accuracy/detail information may be selected as the data source. In an example of a location sensor as the source of the data, if the granularity level is high and thus high accuracy information is to be included in the transformed data, then a location sensor capable of acquiring high accuracy information such as the GPS device may be determined as the source. If the granularity level is lower, then lower accuracy information may be sufficient, and the mobile location estimation application that acquires medium to low accuracy information may be used.

This process is advantageous in that it provides a convenient way to enable various types of access to the data by other users or applications or services based on the granularity level. The policy platform 103 is a means for achieving this advantage.

Figure 4:
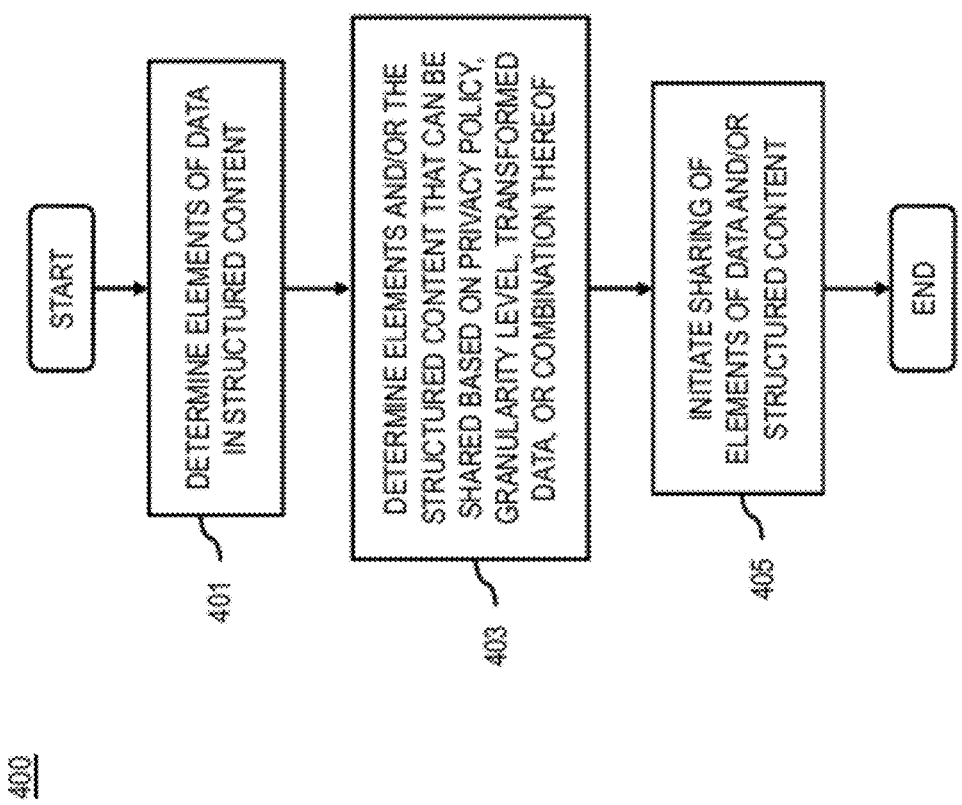
FIG. 4 is a flowchart of a process for sharing elements of the data and/or the structured content, according to one embodiment.

FIG. 4 is a flowchart of a process for sharing elements of the data and/or the structured content, according to one embodiment. In one embodiment, the policy platform 103 performs the process 400 and is implemented in, for instance, a chip set including a processor and a memory as shown in FIG. 9. In step 401, the policy platform 103 determines elements of the data in structured content. The data in structured content may include multiple elements, wherein each element has its own information. For example, when an image data is created at the user device may include multiple elements, such as the image itself (which may be captured by a camera of the user device), a time of capture, a location of capture (which may be acquired via the GPS device), a user profile information, etc. Thus, each element may contain different information for the data. In step 403, the policy platform 103 determines the elements and/or the structured content that can be shared based on the privacy policy, the granularity level, the transformed data, or a combination thereof. There may be privacy policy and/or the granularity level for each of the elements of the data. For example, if the granularity level for the image and the time of creation is high and the granularity level for the user profile and the location of creation are low, then the two elements including the image and the time of creation may be shared, while the other two elements including the user profile and the location of creation are not shared. Then, in step 405, the policy platform 103 initiates sharing of the elements of the data and/or the structured content that can be shared.

This process is advantageous in that it provides a way to share multiple sub-components (e.g., elements) within the data depending on their own granularity levels and/or privacy policy. The policy platform 103 is a means for achieving this advantage.

Figure 5B:
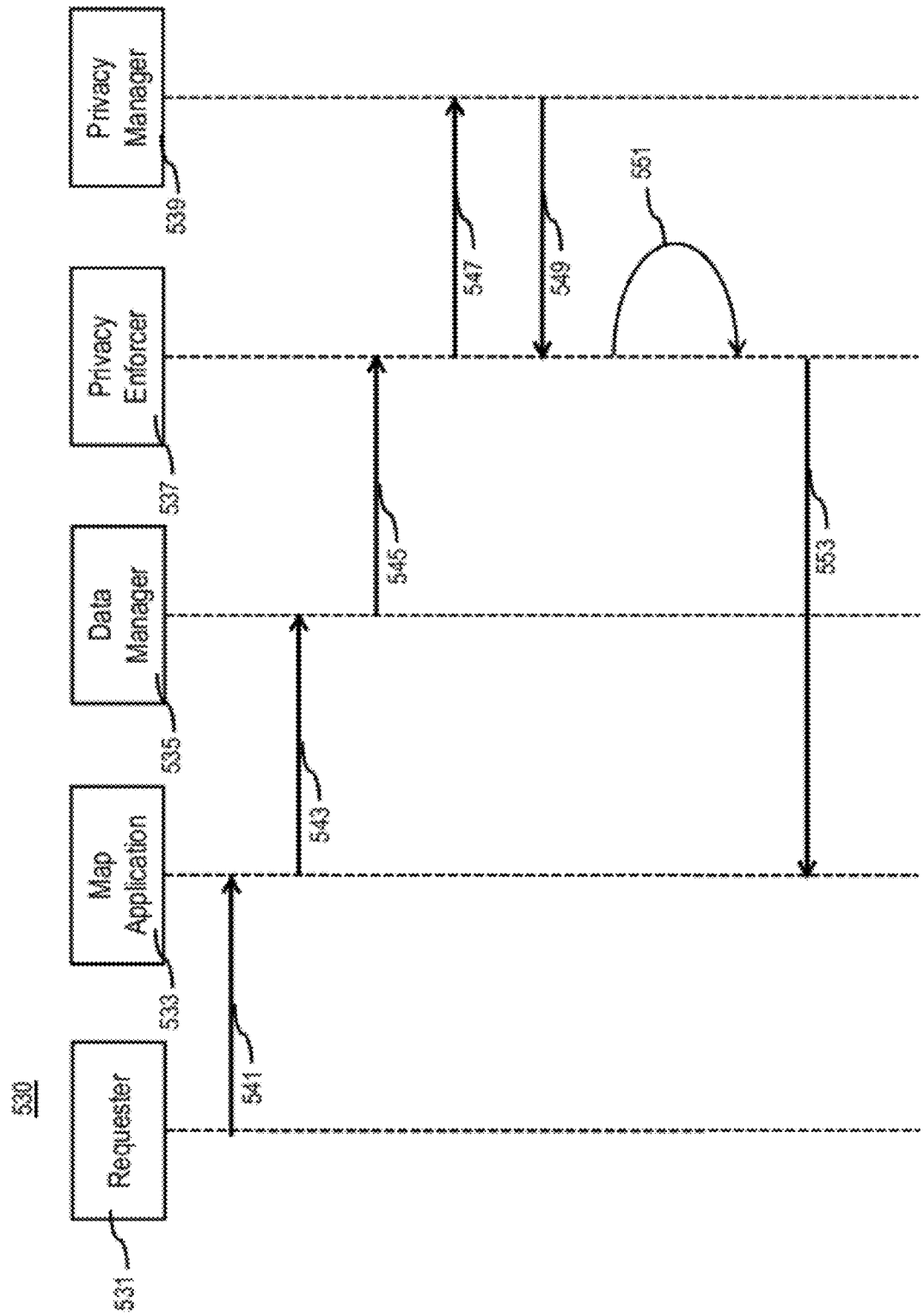

FIGS. 5A-5B are diagrams of processes for sharing a location information of the user with a requester of the location information, according to one embodiment. FIG. 5A is a diagram of processes for storing the user's location information, according to one embodiment. The user 501 may be a user of a user device (e.g., UE 101). The device may include or may have access to the location recorder 503, which is an application used for recording a location, a GPS device 505, and a data manager 507 to manage and/or store the location information. In step 511, the user 501 sends a command to the location recorder 503 to record a current location of the user 501. Then, in step 513, the location recorder 503 causes the GPS device 505 to acquire a GPS coordinate of the user device. The GPS device 505 returns the GPS coordinate to the location recorder 503 in step 515. Then, the location recorder 503 sends the GPS coordinate or location information based on the GPS coordinate to the data manager 507, as shown in step 517. Thus, the location information may be stored in a data storage connected to the data manager 507.

FIG. 5B is a diagram of processes for accessing the location information of the user, according to one embodiment. The processes in FIG. 5B may occur after the processes of FIG. 5A. The requester 531 may be another user, an application, a service, etc., that is capable of requesting the location information. The map application 533 is an application that is capable of showing the location information on a map. The data manager 535 managers and/or stores the location information of a user. The data manager 535 may be the data manager 507 of FIG. 5A. The privacy enforcer 537 may be an application or a module that enforces a privacy policy for accessing the user's location. The privacy manager 539 manages privacy policy. In step 541, the requester 531 may request a location of the user (e.g., the user 501) to the map application 533. Upon this request, in step 543, the map application 533 may send a request to the data manager 535 for the location information. Then, the data manager 535 finds the location information of the user and sends the location information to the privacy enforcer 537, as shown in step 545. The privacy enforcer 537 in step 547 sends a request to the privacy manager 539 for a privacy policy associated with the location information, and then the privacy manager 539 returns a corresponding privacy policy to the privacy enforcer 537 as shown in step 549. Then, the privacy enforcer 537 determines a granularity level for the location information based on the privacy policy, and process the location information to generate transformed data based on the granularity level, as shown in step 551. In step 553, this transformed data is sent from the privacy enforcer 537 to the map application 533, such that the map application 533 can present the transformed data for the user's location.

FIGS. 6A-6E are diagrams of user interfaces utilized in the processes of FIG. 3, according to one embodiment. FIGS. 6A-6B are diagrams of user interfaces by a user sharing the user's information. FIG. 6A shows a user interface 600 to select an application or a service. The title section 601 shows that this user interface 600 is for selecting an application or a service. The list 603 shows a list of applications and services that can be selected to set privacy settings. In this case, the Map Application has been selected, as indicated by a gray shade. The OK button 605 may be pressed to proceed with the selection, and the options button 607 may be selected to show various options. FIG. 6B shows a user interface 610 showing various privacy settings. This user interface 610 may be presented after the selection is made in the user interface 600 of FIG. 6A. The title section 611 shows that this user interface 610 is for setting privacy settings. The main screen 613 shows various privacy settings with selection buttons such as buttons 615 and 617. Button 615 is shaded in gray to indicate that the setting corresponding to this button 615 is selected. The OK button 619 may be pressed to proceed with the selection, and the options button 621 may be selected to show various options.

FIGS. 6C-6E are diagrams of user interfaces by a requester that requests the user to share a location information of the user. FIG. 6C shows a user interface 630 for a requester with a low granularity level. The title section 631 shows that the user interface 630 is for a map application. The title section 631 also shows that the map application shows at a state level. Thus, the map 633 shows states in a zoomed-out map view. The user location indicator 635 shows which state the user is located on the map 633. The user location indicator 635 also shows the user ID, which is USER121, because the user chose to share the user's personal details as shown in FIG. 6B. The back button 637 goes back to a previous user interface, and the options button 639 may be selected to show various options. FIG. 6D shows a user interface 650 for a requester with a medium granularity level. The title section 631 shows that the user interface 630 is for a map application. The title section 651 also shows that the map application shows at a city level. Thus, the map 653 shows cities in this medium-zoom map view. The map 653 also has city indicators such as the city indicator 655 for the city Springfield. The user location indicator 637 shows a location and a name of the city where the user is located on the map 653. The user location indicator 657 also shows the user ID, which is USER121, because the user chose to share the user's personal details as shown in FIG. 6B. The back button 659 goes back to a previous user interface, and the options button 661 may be selected to show various options. Further, FIG. 6E shows a user interface 670 for a requester with a high granularity level. The title section 671 shows that the user interface 670 is for a map application, and also indicates that the map application shows at a street level. Therefore, the map 673 shows streets around the user's location zoomed-in map view. The map 673 also shows street names, such as the street name 675 for the $9^{th}$ street. The user location indicator 677 shows a location of the user on the map 673. In this user interface 670, the user location indicator 677 shows that the user is located at a cross section of Main Street and $9^{th}$ Street. The user location indicator 677 also shows the user ID, which is USER121, because the user chose to share the user's personal details as shown in FIG.

6B. The back button 679 goes back to a previous user interface, and the options button 681 may be selected to show various options.

Figure 7A:
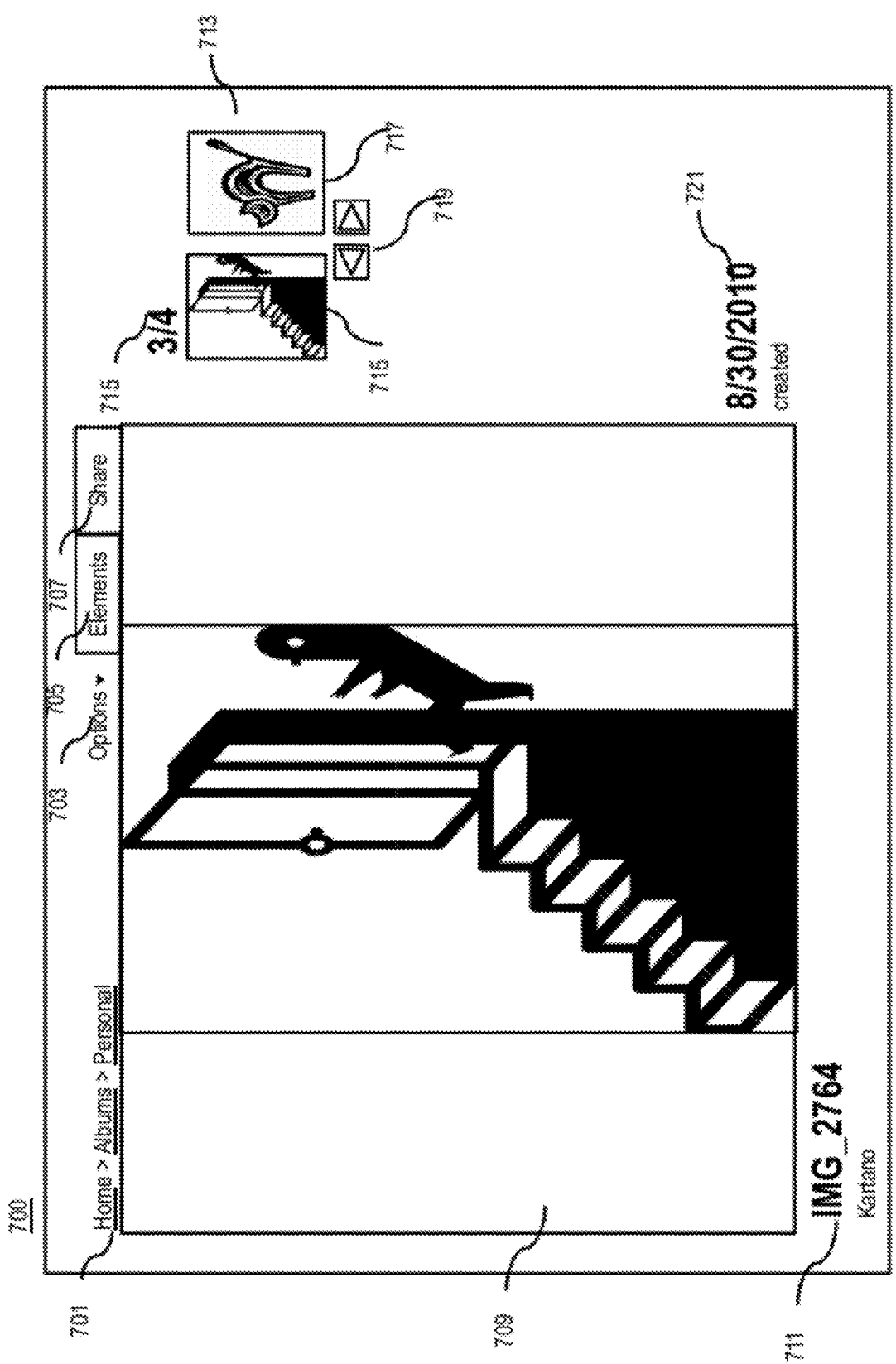
FIGS. 7A and 7B show diagrams indicating various elements present in a structured content, according to one embodiment.
Figure 7B:
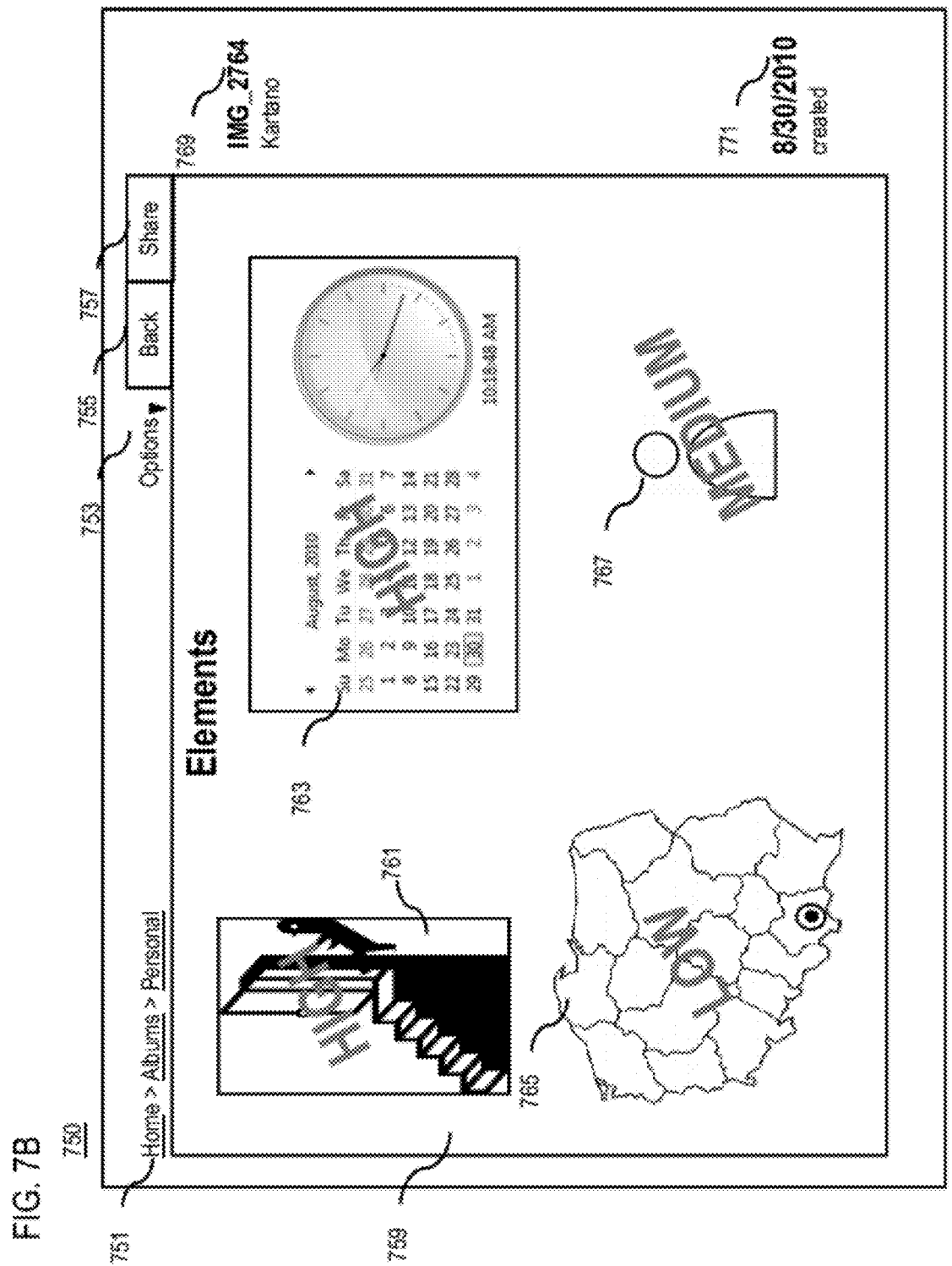

FIGS. 7A and 6B show diagrams indicating various elements present in a structured content, according to one embodiment. FIG. 7A shows a picture data as structured content presented in the user interface 700. The root information 701 shows that this picture is under a folder "Personal." The options button 703 can be selected to show various options, the elements button 705 can be selected to show elements of the data in the structured content, and the share button 707 may be selected to share the elements of the data. The image screen 709 shows the picture in the data, and the data name section 711 shows the name of the data and the author "Kartano." The mini browser 613 shows the number of pages that can show thumbnail images 715 and 717, and the thumbnail images may be browsed by the left and right buttons 719. The date section 721 indicates that this data has been created on Aug. 30, 2010. If the elements button 705 is selected, the user interface 750 of FIG. 7B is presented to show the elements of the data. The root information 751 shows that this picture is under a folder "Personal." The options button 753 can be selected to show various options, the back button 755 can be selected to go back to a previous user interface, and the share button 757 may be selected to share the elements of the data. The elements section 759 shows that the data has four elements, including the picture element 761, a time of creation element 763, the location information element 765, and a user profile element 765. The picture element 761, a time of creation element 763, the location information element 765, and a user profile element 765 have their respective granularity levels, which are high, high, low and medium, respectively, in this example. Thus, when the elements are shared, the elements are shared according to their respective granularity levels. Further, the data name section 769 shows the name of the data and the author "Kartano," and the date section 771 indicates that this data has been created on Aug. 30, 2010

The processes described herein for providing data based on granularity information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
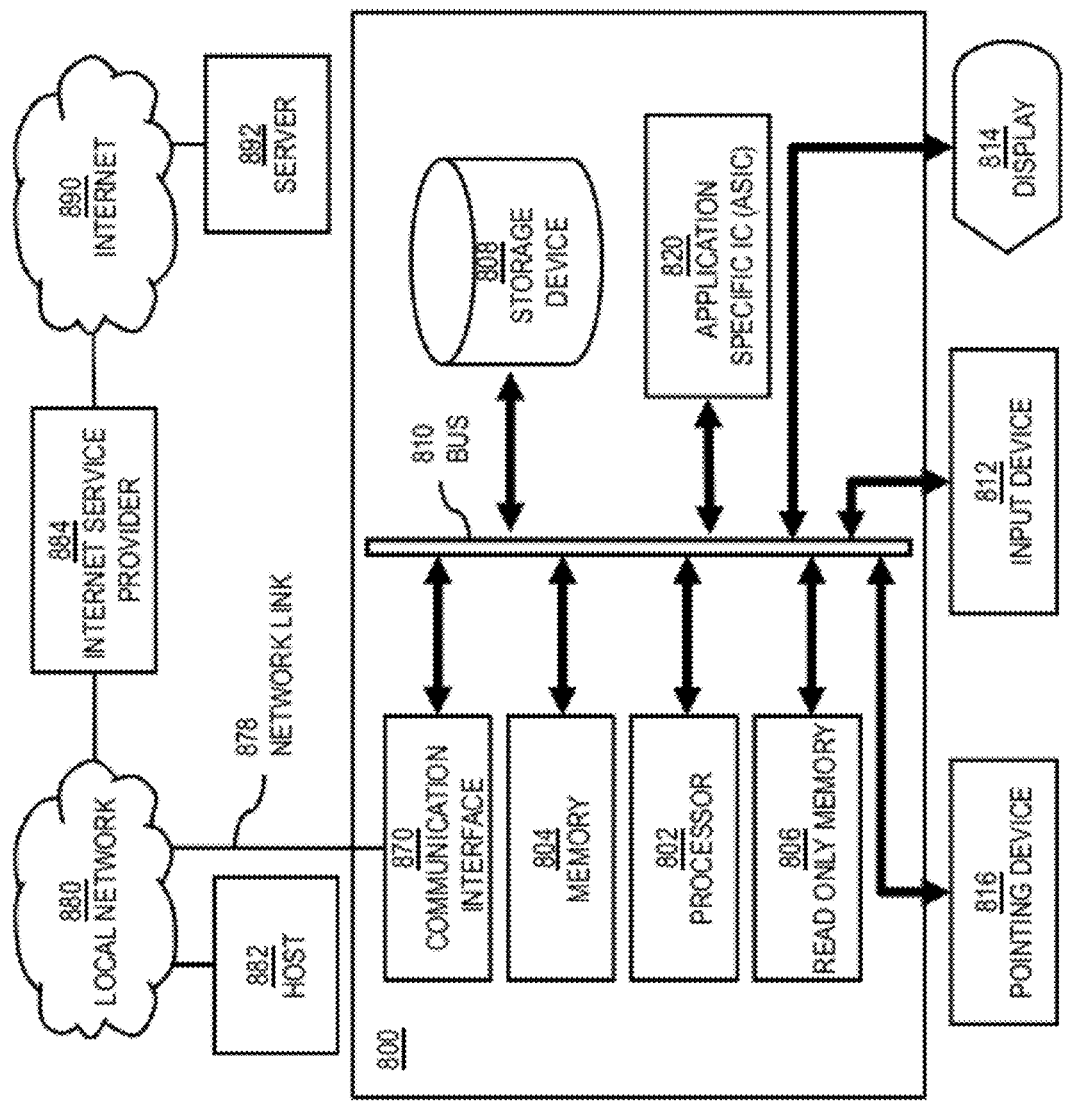
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide data based on granularity information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing data based on granularity information.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing data based on granularity information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing data based on granularity information. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing data based on granularity information, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing data based on granularity information.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide data based on granularity information as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing data based on granularity information.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide data based on granularity information. The memory 905 also stores the data associated with or generated by the execution of the inventive steps.

Figure 10:
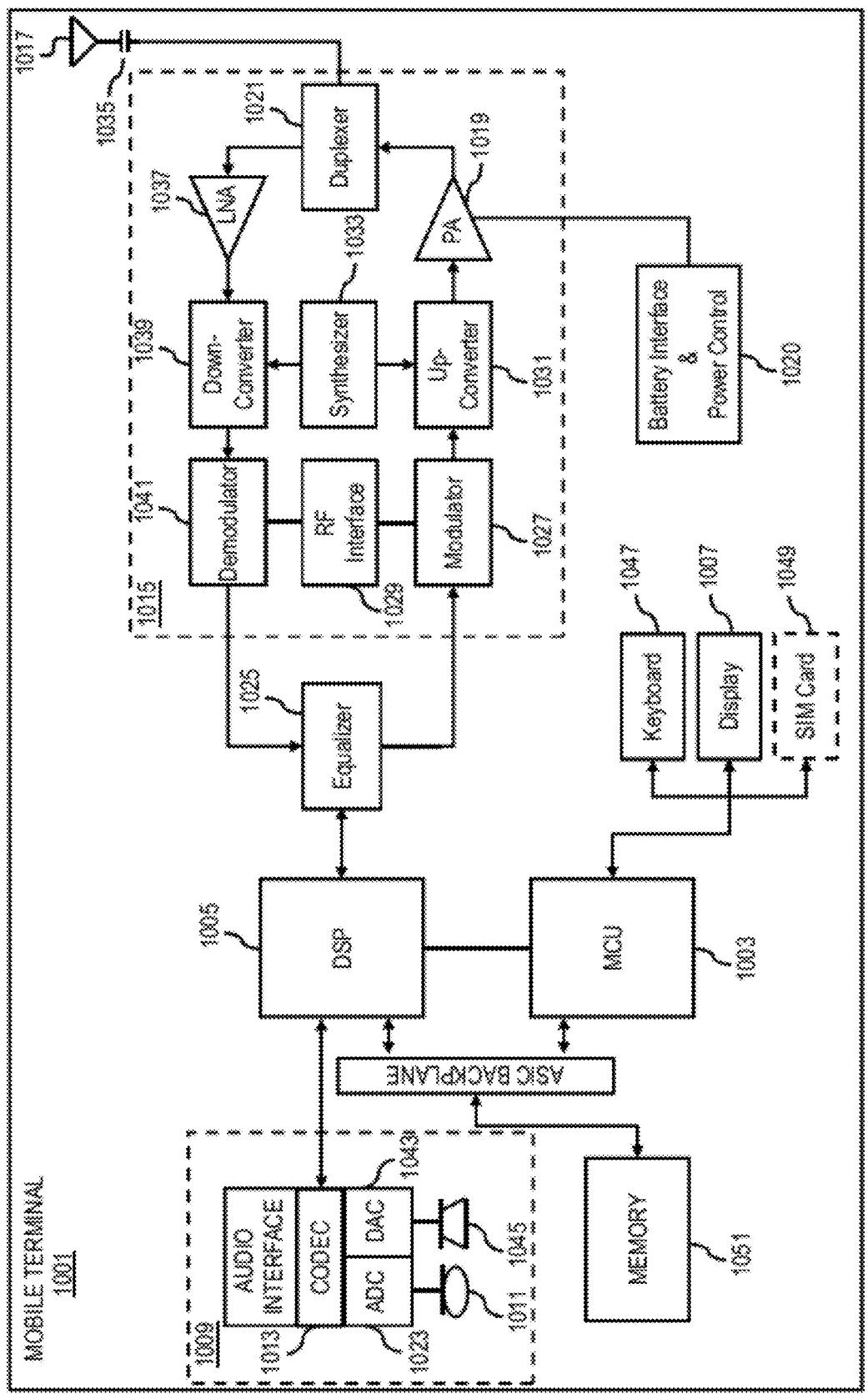
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing data based on granularity information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing data based on granularity information. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide data based on granularity information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
initiating, by an apparatus, a presentation of a privacy policy setting table on a user interface of a user device, wherein the privacy policy setting table includes usage class parameters, sensitivity class parameters, and data type parameters;
receiving, at the apparatus, user selections from the user device within the privacy policy setting table that are applicable to a plurality of applications including a group of social network service applications that belong to a social networking service platform;
receiving a request, at the apparatus from a social networking service platform application of another device, for accessing data that is associated with the user device, a user of the user device, or a combination thereof and is captured at the user device via one or more user inputs, one or more sensors of the user device, or a combination thereof;
in response to the request, determining, by the apparatus, a first granularity level corresponding to the social networking service platform application and the another device for the data based, at least in part, on the privacy policy setting table;
filtering, by the apparatus, the data of a second granularity level to generate transformed data of the first granularity level, wherein the data includes location information, and the second granularity level contains more location details and exactness, accessible by the another device, than the data of the first granularity level; and
initiating, by the apparatus, a sharing of the transformed data of the first granularity level with the social networking service platform application of the another device,
wherein the apparatus is embedded in the user device.

2. A method of claim 1, wherein the data type parameters include media, event, location, or a combination thereof, and the data further includes media information, event information, or a combination thereof that is filtered by the apparatus into a different granularity level based on the privacy policy setting table.

3. A method of claim 1, further comprising:
determining at least one intended use of the data by the application,
wherein the granularity level is further based, at least in part, on the at least one intended use, and
wherein the sensitivity class parameters include secret, private and public.

4. A method of claim 1, further comprising:
determining at least one source of the data based, at least in part, on the granularity level; and
initiating acquisition of the data from the at least one source,
wherein the group is a group of digital media services.

5. A method of claim 4, wherein the at least one source includes, at least in part, one or more sensors, one or more other applications, one or more databases, or a combination thereof.

6. A method of claim 1, further comprising:
associating the transformed data with content associated with the application,
wherein the usage class parameters include share, customer care, and advertising.

7. A method of claim 1, wherein the request, the application is associated with structured content, and the method further comprising:
determining one or more elements of the data in the structured content; and
initiating sharing of the one or more elements of the data, the structured content, or a combination thereof based, at least in part, on the at least one privacy policy, the granularity level, the transformed data, or a combination thereof.

8. A method of claim 1, wherein the user selections within the privacy policy setting table are specific to the group of social network service applications.

9. A method of claim 1, wherein the granularity level determines an amount of the data, a type of the data, a detail level of the data, or a combination thereof to include in the transformed data.

10. A method of claim 1, further comprising:
determining at least one recipient device, at least one recipient user, or a combination thereof associated with the request,
wherein the granularity level is further based, at least in part, on the at least one recipient device, the at least one recipient user, or a combination thereof.

11. A method of claim 1, wherein the data includes, at least in part, context data, user identity data, user profile data, or a combination thereof.

12. A method of claim 11, wherein the data further includes calendar information captured at the user device via one or more user inputs, and wherein the second granularity level contains more temporal details and exactness than the first granularity level.

13. An apparatus comprising:
at least one hardware processor; and
at least one memory including computer program code for one or more programs, the at least one memory and the computer program code configured to, with the at least one hardware processor, cause the apparatus embedded in a user device to perform at least the following,
initiate a presentation of a privacy policy setting table on a user interface of the user device, wherein the privacy policy setting table includes usage class parameters, sensitivity class parameters, and data type parameters;
receive user selections from the user device within the privacy policy setting table that are applicable to a plurality of applications including a group of social network service applications that belong to social networking service platform;
receive a request, at the apparatus from a social networking service platform application of another device, for accessing data that is associated with the user device, a user of the user device, or a combination thereof and is captured at the user device via one or more user inputs, one or more sensors of the user device, or a combination thereof;
in response to the request, determine a first granularity level corresponding to the social networking service platform application and the another device for the data based, at least in part, on the privacy policy setting table;
filter the data of a second granularity level to generate transformed data of the first granularity level, wherein the data includes location information, and the second granularity level contains more location details and exactness, accessible by the another device, than the data of the first granularity level; and initiate a sharing of the transformed data of the first granularity level with the social networking service platform application of the another device, wherein the apparatus is embedded in the user device.

14. An apparatus of claim 13, wherein the data type parameters include media, event, location, or a combination thereof, and the data further includes media information, event information, or a combination thereof that is filtered by the apparatus into a different granularity level based on the privacy policy setting table.

15. An apparatus of claim 13, wherein the apparatus is further caused to: determine at least one intended use of the data by the application,
wherein the determination of the granularity level is further based, at least in part, on the at least one intended use.

16. An apparatus of claim 13, wherein the apparatus is further caused to:
determine at least one source of the data based, at least in part, on the granularity level; and determine to cause, at least in part, acquisition of the data from the at least one source.

17. An apparatus of claim 13, wherein the request, the application, or a combination thereof is associated with structured content, and wherein the apparatus is further caused to:
determine one or more elements of the data in the structured content; and
initiate sharing of the one or more elements of the data, the structured content, or a combination thereof based, at least in part, on the at least one privacy policy, the granularity level, the transformed data, or a combination thereof.

18. An apparatus of claim 13, wherein the apparatus is further caused to:
determine at least one recipient device, at least one recipient user, or a combination thereof associated with the request,
wherein the granularity level is further based, at least in part, on the at least one recipient device, the at least one recipient user, or a combination thereof.

19. A non-transitory computer-readable storage medium carrying one or more sequences of one or more instructions which, when executed by one or more processors, cause an apparatus embedded in a user device to at least perform the following steps:
initiating a presentation of a privacy policy setting table on a user interface of the user device, wherein the privacy policy setting table includes usage class parameters, sensitivity class parameters, and data type parameters;
receiving user selections within the privacy policy setting table that are applicable to a plurality of applications including a group of social network service application that belong to a social networking service platform;
receiving a request, at the apparatus from a social networking service platform application of another device, for accessing data that is associated with the user device, a user of the user device, or a combination thereof and is captured at the user device via one or more user inputs, one or more sensors of the user device, or a combination thereof;
in response to the request, determining a first granularity level corresponding to the social networking service platform application and the another device for the data based, at least in part, on the privacy policy setting table;
filtering the data of a second granularity level to generate transformed data of the first granularity level, wherein the data includes location information, and the second granularity level contains more location details and exactness, accessible by the another device, than the data of the first granularity level; and
initiating a sharing of the transformed data of the first granularity level with the social networking service platform application of the another device, wherein the apparatus is embedded in the user device.

20. A non-transitory computer-readable storage medium of claim 19, wherein the data type parameters include media, event, location, or a combination thereof, and the data further includes media information, event information, or a combination thereof that is filtered by the apparatus into a different granularity level based on the privacy policy setting table.

* * * * *